(12) United States Patent
Aizikovich

(10) Patent No.: US 11,321,472 B1
(45) Date of Patent: May 3, 2022

(54) SYSTEMS AND METHODS FOR MONITORING SECURE WEB SESSIONS

(71) Applicant: CyberArk Software Ltd., Petach-Tikva (IL)

(72) Inventor: Evgeni Aizikovich, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 17/514,442

(22) Filed: Oct. 29, 2021

(51) Int. Cl.
*G06F 21/60* (2013.01)
*H04L 9/08* (2006.01)
*H04L 29/06* (2006.01)

(52) U.S. Cl.
CPC .......... *G06F 21/602* (2013.01); *H04L 9/0822* (2013.01); *H04L 9/0872* (2013.01); *H04L 9/0897* (2013.01); *H04L 63/1425* (2013.01)

(58) Field of Classification Search
CPC ... G06F 21/602; H04L 9/0822; H04L 9/0872; H04L 9/0897; H04L 63/1425
See application file for complete search history.

(56) References Cited

U.S. PATENT DOCUMENTS

| 11,038,863 | B2 * | 6/2021 | Venkiteswaran | H04L 67/146 |
| 2013/0191630 | A1 * | 7/2013 | Ylonen | H04L 63/16 713/153 |
| 2013/0191631 | A1 * | 7/2013 | Ylonen | H04L 63/16 713/153 |
| 2019/0354709 | A1 * | 11/2019 | Brinskelle | H04L 63/0823 |

* cited by examiner

*Primary Examiner* — Abiy Getachew
(74) *Attorney, Agent, or Firm* — Finnegan, Henderson, Farabow, Garrett & Dunner, LLP

(57) ABSTRACT

Disclosed embodiments relate to systems and methods for securely and privately auditing web sessions. Techniques include receiving, from a browser extension executing on a user endpoint device, encrypted browser session data and an encrypted session key, storing the encrypted browser session data and the encrypted session key; receiving, from an auditor endpoint device, an audit request associated with the stored encrypted browser session data; retrieving the stored encrypted browser session data and the stored encrypted session key based on the audit request; and transmitting at least some of the encrypted browser session data and the encrypted session key to the auditor endpoint device to enable access to the browser session data by the auditor endpoint device.

20 Claims, 8 Drawing Sheets

SYSTEMS AND METHODS FOR MONITORING SECURE WEB SESSIONS

BACKGROUND

Technical Field

The present disclosure relates generally to cybersecurity for single sign-on solutions and, more specifically, to systems and methods for securely recording, storing, and auditing recorded sensitive sessions.

Background Information

Individuals and organizations are increasingly relying on a greater number of different software applications for business as well as personal use. As each software application may require authentication of the user to access the software, it may also be increasingly burdensome on individuals and organizations to maintain separate credentials for each software application. Many software vendors offer single sign-on (SSO) solutions for conveniently accessing these resources. In particular, these solutions provide a uniform way for users to authenticate just once to a trusted system, referred to as an identity provider (IDP), and afterwards be able to access other systems without being prompted for separate authentication. These SSO solutions may mitigate risk for access to third-party applications because user passwords are not stored or managed externally, they reduce password fatigue from different username and password combinations, they reduce time spent re-entering passwords for the same identity, and they reduce information technology (IT) costs due to lower numbers of help desk calls about passwords.

However, user identity has increasingly become a focal point in addressing cybersecurity threats for an organization. For example, in some situations, regular users may become privileged and thus may have access to more sensitive resources. Accordingly, additional security measures may be required, which may include monitoring and recording activities of users that may be audited to provide accountability against malicious behavior. Many current SSO solutions provide users a way to access applications but fail to record the activity of these users in those sessions. To complement these SSO solutions, some additional third-party solutions are available that consist of agent software installed on user endpoints that records all activity of a user, all the time. This method of continuous storage introduces a significant demand on storage, processing, and transmission requirements for recorded session. These current solutions also significantly impact security for an organization, as recordings may be stored unencrypted and accessible to the third-party vendors that provide the recording solution.

Accordingly, in view of these and other deficiencies in existing techniques, technological solutions are needed for securely and privately auditing web sessions. In particular, solutions should advantageously provide a tailored approach for capturing browser session data, which may reduce the bandwidth requirements for storage and transfer of data. Further, technological solutions should allow recorded browser session data to be stored in a manner that is inaccessible outside of the organization, thereby improving organizational security while enabling auditing of SSO sessions. While a SSO session is used herein by way of example, it is to be understood that the disclosed embodiments may equally be used for any form of secure user session.

SUMMARY

The disclosed embodiments describe non-transitory computer readable media, systems, and methods for securely and privately auditing web sessions. For example, in an embodiment, a non-transitory computer readable medium may include instructions that, when executed by at least one processor, cause the at least one processor to perform operations for securely and privately auditing web sessions. The operations may comprise receiving, from a browser extension executing on a user endpoint device, encrypted browser session data and an encrypted session key. The encrypted browser session data may comprise browser session data recorded by the browser extension and encrypted by the browser extension using a session key; and the encrypted session key may comprise the session key having been encrypted by the browser extension using a first auditor key associated with a tenant. The operations may further comprise storing the encrypted browser session data and the encrypted session key; receiving, from an auditor endpoint device, an audit request associated with the stored encrypted browser session data; retrieving the stored encrypted browser session data and the stored encrypted session key based on the audit request; and transmitting at least some of the encrypted browser session data and the encrypted session key to the auditor endpoint device to enable access to the browser session data by the auditor endpoint device. The auditor endpoint device may be configured to access a second auditor key associated with the tenant from a key storage device; decrypt the encrypted session key using the second auditor key; and decrypt the encrypted browser session data using the decrypted session key to enable access to the browser session data.

According to a disclosed embodiment, the second auditor key may be stored on the key storage device and is inaccessible to the at least one processor.

According to a disclosed embodiment, the operations may further comprise making the first auditor key available to the browser extension based on an indication of the tenant.

According to a disclosed embodiment, the indication of the tenant may be based on authentication of the user.

According to a disclosed embodiment, the browser extension may be configured to detect that a user has navigated to a protected navigation location; and generate the session key based on the detected navigation to the protected navigation location.

According to a disclosed embodiment, storing the encrypted browser session data and the encrypted session key may comprise storing the encrypted browser session data and the encrypted session key in a database.

According to a disclosed embodiment, the browser session data may be derived from actions taken by a user during a browser session.

According to a disclosed embodiment, the browser extension may be configured to detect a recording trigger associated with the endpoint device; and record the browser session data based on the detected recording trigger.

According to a disclosed embodiment, the recording trigger may be invoked in response to an action taken by a user during the browser session.

According to another disclosed embodiment, there may be a computer-implemented method for securely and privately auditing secured web sessions. The method may comprise receiving, from a browser extension executing on a user endpoint device, encrypted browser session data and an encrypted session key. The encrypted browser session data may comprise browser session data recorded by the browser extension and encrypted by the browser extension using a session key; and the encrypted session key may comprise the session key having been encrypted by the browser extension using a first auditor key associated with a tenant. The method may further comprise storing the encrypted browser session data and the encrypted session key; receiving, from an auditor endpoint device, an audit request associated with the stored encrypted browser session data; retrieving the stored encrypted browser session data and the stored encrypted session key based on the audit request; and transmitting at least some of the encrypted browser session data and the encrypted session key to the auditor endpoint device to enable access to the browser session data by the auditor endpoint device. The auditor endpoint device may be configured to access a second auditor key associated with the tenant from a key storage device; decrypt the encrypted session key using the second auditor key; and decrypt the encrypted browser session data using the decrypted session key to enable access to the browser session data.

According to a disclosed embodiment, the method may further comprise receiving, from the auditor endpoint device, an indication of a selected subset of the encrypted browser session data.

According to a disclosed embodiment, transmitting at least some of the encrypted browser session data to the auditor endpoint device may comprise transmitting the selected subset of the encrypted browser session data.

According to a disclosed embodiment, the selected subset may be selected based on at least one of: a particular trigger event, a particular user, a particular user session, a range of times, a range of events, a selection of one or more events, a search function, and a filter function.

According to a disclosed embodiment, the key storage device may be a mobile device.

According to a disclosed embodiment, the audit request may be based on an auditor identity navigating to a recording auditing navigation location.

According to a disclosed embodiment, accessing the second auditor key from the key storage device by the auditor endpoint device may comprise: generating a transmission key pair comprising a first transmission key and a second transmission key; transmitting the first transmission key to the key storage device, wherein the key storage device is configured to: retrieve an encrypted second auditor key, the encrypted second auditor key having been encrypted by the key storage device using the first transmission key and transmit the encrypted second auditor key to a specified network location; retrieving the encrypted second auditor key from the specified network location; and decrypting the encrypted second auditor key using the second transmission key.

According to a disclosed embodiment, accessing the second auditor key from the key storage device may comprise: generating a transmission identifier; transmitting the transmission identifier to the auditor endpoint device; and selecting the second transmission key based on the transmission identifier.

According to a disclosed embodiment, the auditor endpoint device may be configured to present the first transmission key to the key storage device via a short-range communication.

According to a disclosed embodiment, the short-range communication may include at least one of displaying a machine-readable code encrypting the transmission key or transmitting the transmission key via a short-range communication protocol.

According to a disclosed embodiment, the key storage device may be configured to encrypt the second auditor key based on an authentication of an auditor identity using the key storage device.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
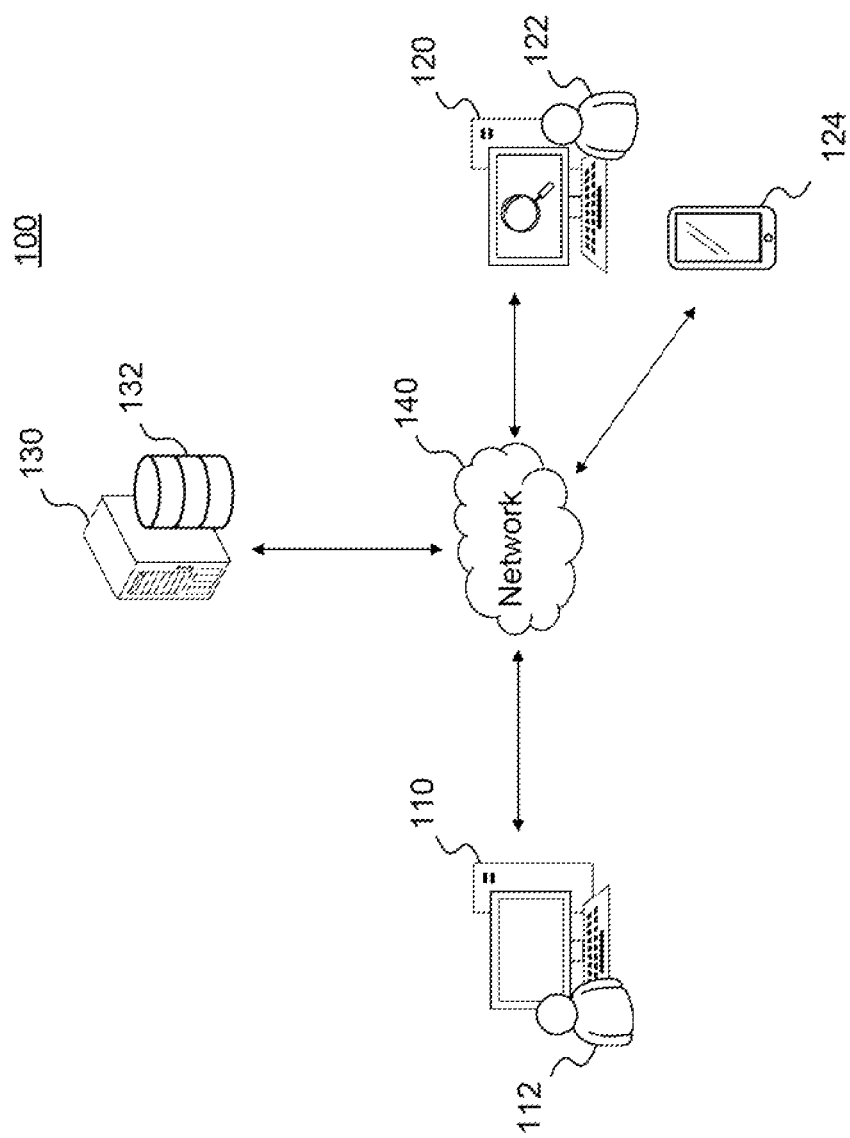
FIG. 1 illustrates an example system environment for securely and privately auditing web sessions, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely establishing secretless and remote native access sessions described herein overcome several technological problems relating to security, efficiency, and functionality in the fields of cybersecurity and remote session monitoring. In particular, the disclosed embodiments provide techniques for securely monitoring and recording user activity on a client endpoint device. As discussed above, many current third-party software agents that record user activity store the recorded activity in an insecure manner. For example, the third-party software may have access to the recorded activity, which may present security issues for the organization. Further, many current solutions consist of agent software installed on user endpoints that record all activity of the user at all times. Accordingly, these existing techniques require expansive storage to capture all of the recorded activity. Moreover, because all activity is recorded, it can be difficult for an auditor wishing to view the recorded data to meaningfully navigate through this vast volume of recorded data.

The disclosed embodiments provide technical solutions to overcome these and other problems with the current techniques. In particular, the disclosed techniques record, transfer and store the recorded user activity in a secure manner. Accordingly, activity of a user may be accessible only to the user's organization (which may be referred to as a "tenant" of the system) and may not be accessible to any third-party servers where the information is stored, thereby improving security for the organization. Further, the disclosed techniques allow for particular sensitive user activities to be recorded, rather than all activities of a user. For example, the user's activity may be monitored using a lightweight browser extension, without the need to install dedicated software agents on the user endpoint device. The browser extension may detect when the user navigates to sensitive network locations and may record only those sensitive sessions. Further, the browser extension may monitor for certain triggers of user activity and record screenshots or other data based on the activity. Accordingly, the disclosed embodiments provide techniques for tailored recording of activity that may be of interest, which may significantly decrease the demand on bandwidth for transferred data as well as storage of the recorded activity. For these, and other reasons that will be apparent to those skilled in the art from the disclosure herein, the disclosed techniques provide improved security, efficiency, and functionality over existing techniques.

Reference will now be made in detail to the disclosed embodiments, examples of which are illustrated in the accompanying drawings.

FIG. 1 illustrates an example system environment 100 for securely and privately auditing web sessions, consistent with the disclosed embodiments. System environment 100 may include one or more user endpoint devices 110, one or more auditor endpoint devices 120, one or more key storage devices 124, and one or more servers 130, as shown in FIG. 1. System environment 100 may represent a system or network environment in which activities of a user 112 on user endpoint device 110 are recorded and stored on server 130. An auditor 122 may then audit these recordings using an auditor endpoint device 120. As described above, the recording, transmission, and storage of the recorded user activity may be performed in a secure manner, such that only user endpoint device 110 and auditor endpoint device 120 can have access to the recorded activity.

The various components of system 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

User endpoint device 110 may be configured such that user 112 may access a protected navigation location through a browser or other software executing on user endpoint device 110. As used herein, a protected navigation location may be any network location deemed sensitive. Activity of a user at the network location may be audited to provide increased accountability for the user. For example, a protected navigation location may include a particular URL (or URL domain, etc.), a network location internal to an organization, or any other sensitive network location. User endpoint device 110 may include any form of computer-based device or entity through which user 112 may access a protected navigation location. For example, user endpoint device 110 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of accessing web pages or other network locations. In some embodiments, user endpoint device 110 may be a virtual machine (e.g., based on AWS™, Azure™, IBM Cloud™, etc.), container instance (e.g., Docker™ container, Java™ container, Windows Server™ container, etc.), or other virtualized instance. Using the disclosed methods, activity of user 112 through user endpoint device 110 may be monitored and recorded by a browser extension executing on user endpoint device 110.

User endpoint device 110 may communicate with server 130 through network 140. For example, user endpoint device 110 may transmit recorded activity of user 112 to server 130. As described in further detail below, the recorded activity may first be encrypted such that it is inaccessible to server 130, which may be operated by a third party to an organization associated with user 112. Server 130 may include any form of remote computing device configured to receive, store, and transmit encrypted browser session data. For example, server 130 may be a server configured to store files accessible through a network (e.g., a web server, application server, virtualized server, etc.). Server 130 may be implemented as a Software as a Service (SaaS) platform through which software for auditing recorded user activity may be provided to an organization as a web-based service. In some embodiments, server 130 may include or access a database 132 configured to store recorded user activity (i.e., browser session data).

Auditor endpoint device 120 may similarly communicate with server 130 through network 140. In particular, an auditor 122 may use auditor endpoint device 120 to access and view recorded user activity stored on server 130. Auditor endpoint device 120 may include any computing device configured to enable a user to access and view data via a remote server. For example, auditor endpoint device may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may access and display recorded data. In some embodiments, user endpoint device 110 may be a virtual machine (e.g., based on AWS™, Azure™, IBM Cloud™, etc.), container instance (e.g., Docker™ container, Java™ container, Windows Server™ container, etc.), or other virtualized instance.

System 100 may also include a key storage device 124. Key storage device 124 may be any computing device that may be used to store a private auditor key and provide the private auditor key based on an authentication of an identity of auditor 122. For example, key storage device 124 may be a mobile phone or other mobile device of auditor 122. Additionally or alternatively, key storage device 124 may include a laptop, a tablet, a wearable device (e.g., a smart watch, smart jewelry, implantable device, fitness tracker, smart clothing, head-mounted display, etc.), or any other device that may be used to authenticate auditor 122. In some embodiments, key storage device 124 may be a memory device, such as a flash drive, a solid-state drive, a hard drive, or the like. In some embodiments, key storage device 124 may not necessarily be a separate device from auditor endpoint device 120. For example key storage device 124 may be implemented as a software-based authenticator for securely storing data within auditor endpoint device 120. Various other forms of key storage devices may be used, consistent with the disclosed embodiments. Key storage device 124 may be configured to communicate with server 130 via network 140. Key storage device 124 may further be configured to communicate with auditor endpoint device 120, either through network 140, or through a separate short-range communication, as described further below.

Figure 2A:
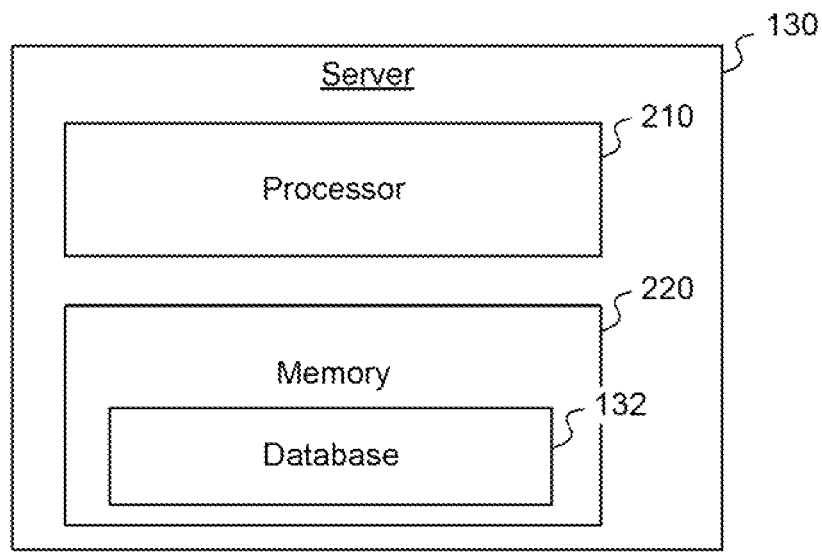
FIG. 2A is a block diagram showing an example server, consistent with the disclosed embodiments.

FIG. 2A is a block diagram showing an example server 130, consistent with the disclosed embodiments. As described above, server 130 may be a computing device (e.g., a server, etc.) and may include one or more dedicated processors and/or memories. For example, server 130 may include a processor (or multiple processors) 210, and a memory (or multiple memories) 220, as shown in FIG. 2A.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in server 130.

Memory 220 may include one or more storage devices configured to store instructions used by the processor 210 to perform functions related to server 130. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from server 130. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a network drive, a cloud storage device, or any other storage device.

In some embodiments, memory 220 may include a database 132 as described above. Database 132 may be included on a volatile or non-volatile, magnetic, semiconductor, tape, optical, removable, non-removable, or other type of storage device or tangible or non-transitory computer-readable medium. Database 132 may also be part of server 130 or separate from server 130. When database 132 is not part of server 130, server 130 may exchange data with database 132 via a communication link. Database 132 may include one or more memory devices that store data and instructions used to perform one or more features of the disclosed embodiments. Database 132 may include any suitable databases, ranging from small databases hosted on a work station to large databases distributed among data centers. Database 132 may also include any combination of one or more databases controlled by memory controller devices (e.g., server(s), etc.) or software. For example, database 132 may include document management systems, Microsoft SQL™ databases, SharePoint™ databases, Oracle™ databases, Sybase™ databases, other relational databases, or non-relational databases, such as mongo and others.

Figure 2B:
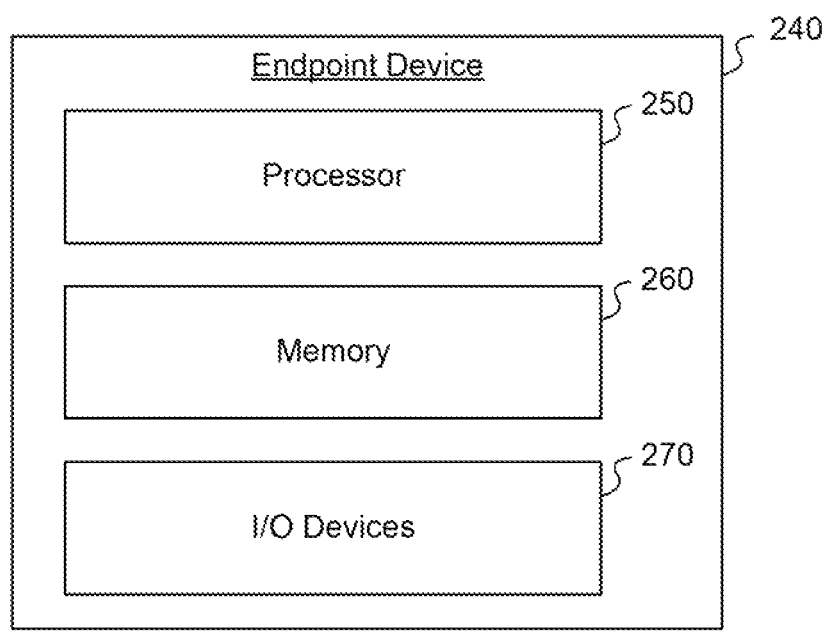
FIG. 2B is a block diagram showing an example endpoint device, consistent with the disclosed embodiments.

FIG. 2B is a block diagram showing an example endpoint device 240, consistent with the disclosed embodiments. Endpoint device 240 may correspond to one or both of user endpoint device 110 and auditor endpoint device 120. As shown in FIG. 2B, endpoint device 240 may include a processor (or multiple processors) 250, a memory (or multiple memories) 260, and/or one or more input/output (I/O) devices 270, as shown in FIG. 2B.

As with processor 210, processor 250 may take the form of, but is not limited to, a microprocessor, embedded processor, or the like, or may be integrated in a system on a chip (SoC). Furthermore, according to some embodiments, processor 250 may be from the family of processors manufactured by Intel®, AMD®, Qualcomm®, Apple®, NVIDIA®, or the like. The processor 250 may also be based on the ARM architecture, a mobile processor, or a graphics processing unit, etc. The disclosed embodiments are not limited to any type of processor configured in endpoint device 240.

Further, similar to memory 220, memory 260 may include one or more storage devices configured to store instructions used by the processor 250 to perform functions related to endpoint device 240. The disclosed embodiments are not limited to particular software programs or devices configured to perform dedicated tasks. For example, the memory 260 may store a single program, such as a user-level application (e.g., a browser), that performs the functions associated with the disclosed embodiments, or may comprise multiple software programs. Additionally, the processor 250 may, in some embodiments, execute one or more programs (or portions thereof) remotely located from endpoint device 240 (e.g., located on server 130). Furthermore, memory 260 may include one or more storage devices configured to store data for use by the programs. Memory 260 may include, but is not limited to a hard drive, a solid state drive, a CD-ROM drive, a peripheral storage device (e.g., an external hard drive, a USB drive, etc.), a network drive, a cloud storage device, or any other storage device.

I/O devices 270 may include one or more network adaptors or communication devices and/or interfaces (e.g., WIFI, BLUETOOTH, RFID, NFC, RF, infrared, Ethernet, etc.) to communicate with other machines and devices, such as with other components of system environment 100 through network 140. For example, endpoint device 240 may use a network adaptor to receive and transmit communications pertaining to recorded user activity data within system environment 100. In some embodiments, I/O devices 270 may also include interface devices for interfacing with a user of endpoint device 240, such as user 112 or 122. For example, I/O devices 270 may comprise a display, touchscreen, keyboard, mouse, trackball, touch pad, stylus, printer, or the like, configured to allow a user to interact with endpoint device 240.

Figure 3:
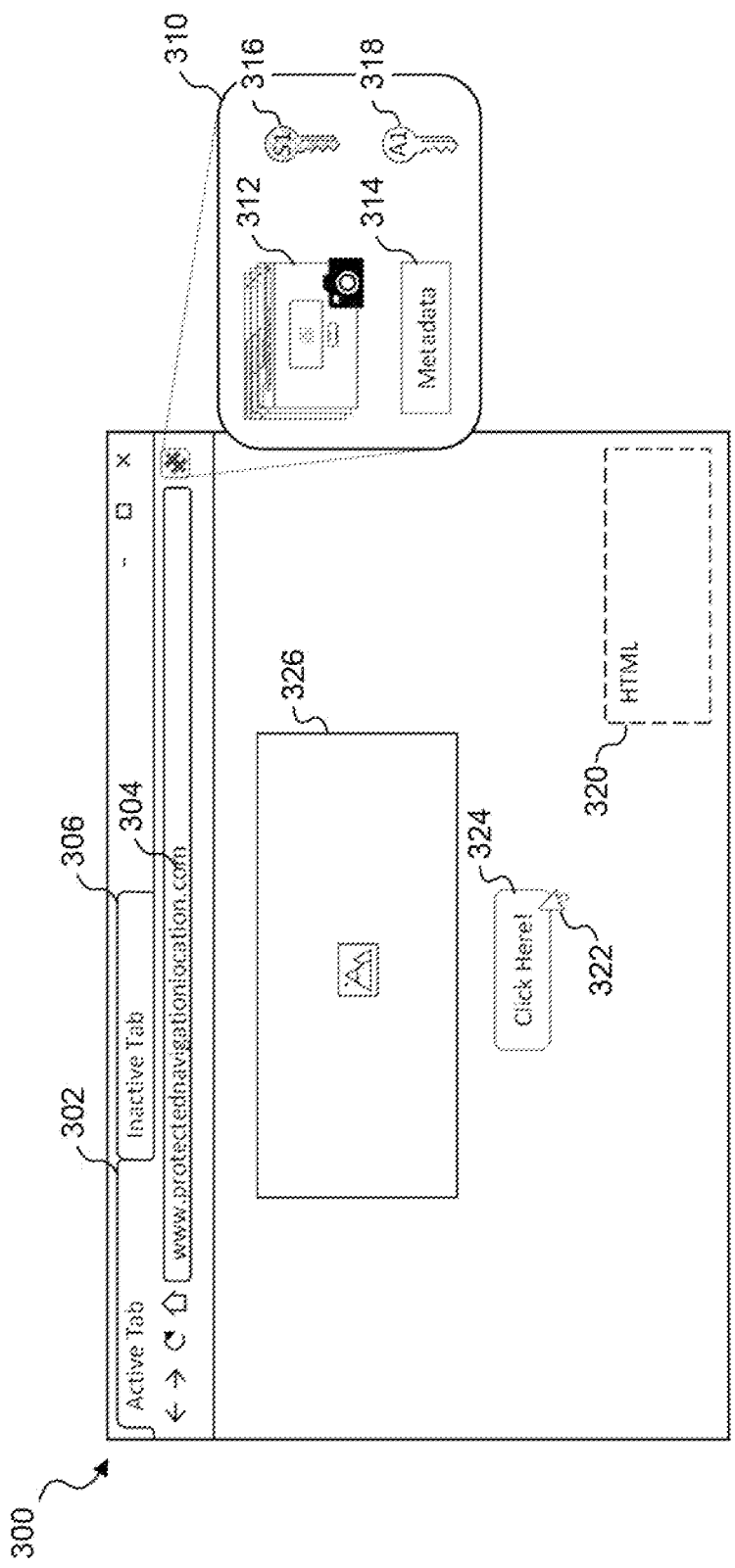
FIG. 3 illustrates an example browser application through which activity of a user may be recorded, consistent with the disclosed embodiments.

FIG. 3 illustrates an example browser application 300 through which activity of a user may be recorded, consistent with the disclosed embodiments. Browser 300 may be any application configured to access webpages or other network locations through a network, such as the Internet. While a browser is used by way of example, the disclosed techniques may equally apply to other applications at which a user's activity may be recorded. In some embodiments, browser 300 may be a web browser application, such as Google Chrome™, Mozilla Firefox™, Microsoft Edge™, Internet Explorer™, Safari™, or similar applications. Browser 300 may execute on user endpoint device 110 and may be used by user 112 to navigate to various webpages or network locations. In some embodiments, browser 300 may include multiple tabs, allowing browser 300 to have multiple webpages open at the same time. For example, this may include an active tab 302, which may be associated with a protected navigation location 304, and an inactive tab 306, that may not be displayed.

Browser 300 may further include a browser extension 310, which may be a software component executing as part of browser 300. As used herein, a browser extension refers to a relatively small software module or component configured to supplement a browser application. In some embodiments, browser extension 310 may interface with browser 300 through an application programming interface (API) for browser 300. Browser extension 310 may be associated with server 130 and may carry out various tasks associated with recording browser session data. For example, browser extension 310 may be configured to capture one or more screenshots 312 as well as metadata 314 associated with activity of a user within protected navigation location 304. These screenshots 312 and metadata 314, as well as any other recorded data, may be referred to collectively as "browser session data."

Browser extension 310 may be configured to initiate recording of this browser session data when user 112 navigates to a sensitive location, such as protected navigation location 304. For example, browser extension 310 may be configured to continuously monitor loaded webpages, which may be represented as uniform resource locators (URLs), or other network addresses accessed by user 112. Browser extension 310 may be configured to detect network locations designated as being sensitive. In embodiments, browser extension 310 may be configured to retrieve configuration information indicating which network locations are designated as sensitive. For example, a tenant or organization may specify particular network locations to be monitored and deemed sensitive. This information may be stored local to browser extension 310, at server 130, or in any other location accessible to browser 310. Accordingly, browser extension 310 may access a list of protected navigation locations or protected domains, which may be predetermined or configured by an organization associated with user 112. In some embodiments, protected navigation location 304 may include a HyperText Markup Language (HTML) element 320. In some embodiments, HTML element 320 may be associated with authentication of user 112 (e.g., as a second factor in a multi-factor authentication), as described further below. In some embodiments, navigation to protected navigation location 304 may be detected based on detection of HTML element 320 by browser extension 310. The recorded browser session data may be captured and transmitted to server 130, as described in further detail below with respect to process 400.

In some embodiments, browser extension 310 may be configured to generate or access one or more keys for encrypting recorded browser session data. For example, this may include generating a session key 316 associated with a particular recording session. In some embodiments, session key 316 may be a symmetric key. Accordingly, in order to generate session key 316, browser extension 310 may store, or have access to, one or more encryption algorithms such as Data Encryption Standard (DES), Triple DES (TDES), Advanced Encryption Standard (AES), CAST-128, Twofish™, Serpent™ or various others. While various keys described herein may be described as either symmetric or public/private key pairs by way of example, it is to be understood that any form of key may be used, depending on the particular application or embodiment.

In some embodiments, browser extension 310 may further be configured to access a first auditor key 318. First auditor key 318 may be part of an auditor key pair, which may be unique to a particular tenant associated with user 112. Server 130 may be associated with multiple tenants and may therefore be used for recording and auditing activity from multiple tenants, which may only be accessible through auditor keys associated with that tenant. In this example, the tenant may refer to an organization to which user 112 and auditor 122 belong. This auditor key pair may be generated for a particular tenant during an initial set-up phase for the particular tenant. In some embodiments, first auditor key 318 may be a public key as part of a private/public key pair.

The first auditor key 318 may be accessed in various ways. In some embodiments, first auditor key 318 may be hidden within HTML element 320. Accordingly, browser extension 310 may detect HTML element 320 and look for and extract first auditor key 318 from within HTML element 320. While including first auditor key 318 in HTML element 320 is provided by way of example, various other methods for providing first auditor key 318 to browser extension 310 may be used. For example, this may include accessing first auditor key 318 through a cookie, a token, or any other suitable techniques for providing first auditor key 318 to browser extension 310 based on navigation to protected navigation location 304.

Once a recording session has been initiated, browser extension 310 may record activity of user 112. In some embodiments, this may include recording all activities of the user. Alternatively or additionally, browser extension 310 may capture screenshots and other data associated with particular actions or types of actions by user 112, which may significantly reduce the storage size of the browser session data. Accordingly, browser extension 310 may be configured to continuously monitor and detect various triggers based on activity of user 112. For example, this may include clicking a mouse (e.g., left click, right click, or additional buttons), moving a mouse, hovering a mouse, touching a display screen, pressing a key on a keyboard, scrolling on a webpage, zooming in or out on a webpage, opening a new browser tab, closing a browser tab, switching to another browser tab, refreshing a webpage, navigating forward or back through the browser, resizing a browser window, navigating to another URL or web page, bookmarking a webpage, performing a copy or paste action, highlighting text or other elements of a webpage, or any other interactions by a user with a webpage, browser, or endpoint device. In some embodiments, data may be captured based on other triggers, such as at set time intervals, actions by user 112 on another device (e.g., a mobile phone, etc.), actions associated with other users in relation to user 112, or other actions that may not be directly associated with interaction with user endpoint device 110.

Based on a detected trigger, browser extension 310 may capture a screenshot 312. Screenshot 312 may include a captured image representing contents of active window 302 as it is displayed to user 112. For example, as shown in FIG. 3, user 112 may click on an element 324 within protected navigation location 304 using cursor 322. This clicking action may trigger browser extension 310 to capture a screenshot of the current display of active tab 302. For example, this may include capturing a screenshot including element 324, an image 326, and any other elements displayed in browser 300. Browser extension 310 may capture additional screenshots based on subsequent trigger actions by user 112.

In some embodiments, browser extension 310 may further capture metadata 314 based on detected triggers. For example, metadata 314 may be captured along with each of screenshots 312. Metadata 314 may include any additional data associated with protected navigation location 304, browser 310, user endpoint device 110, or user 112 that may provide context for a screenshot. For example, this may include the type of activity that triggered the capture, a position of cursor 322 (e.g., in x-y coordinates), information regarding element 324 (e.g., a type of element, location, size, etc.), the URL or network address of active tab 302, a webpage title, timestamp data, location data (e.g., based on global positioning system (GPS), internet protocol (IP) address data, etc.), a tenant identifier, an identifier of the current session, a user identifier, an application identifier, an IP address of user endpoint device 110, a window height and width of browser 300, browser information (e.g., browser type, version, etc.), information about user endpoint device 110 (e.g., model, serial number, operating system version, battery percentage, etc.), data displayed on protected navigation location 304 (e.g., keywords, text near cursor 322, text obtained through optical character recognition of images, etc.), or a wide variety of other forms of data that may be relevant for auditing purposes.

As noted above, browser extension 310 may encrypt the recorded browser session data prior to transmitting it to server 130. For example, browser extension 310 may be configured to encrypt screenshots 312 and metadata 314 using first auditor key 318. Browser extension 310 may further encrypt session key 36 using first auditor key 318. Browser extension 310 may then transmit the encrypted browser session data and the encrypted first auditor key to server 130. Accordingly, server 130 may not have access to the unencrypted browser session data, or the auditor private key, in some embodiments.

Figure 4:
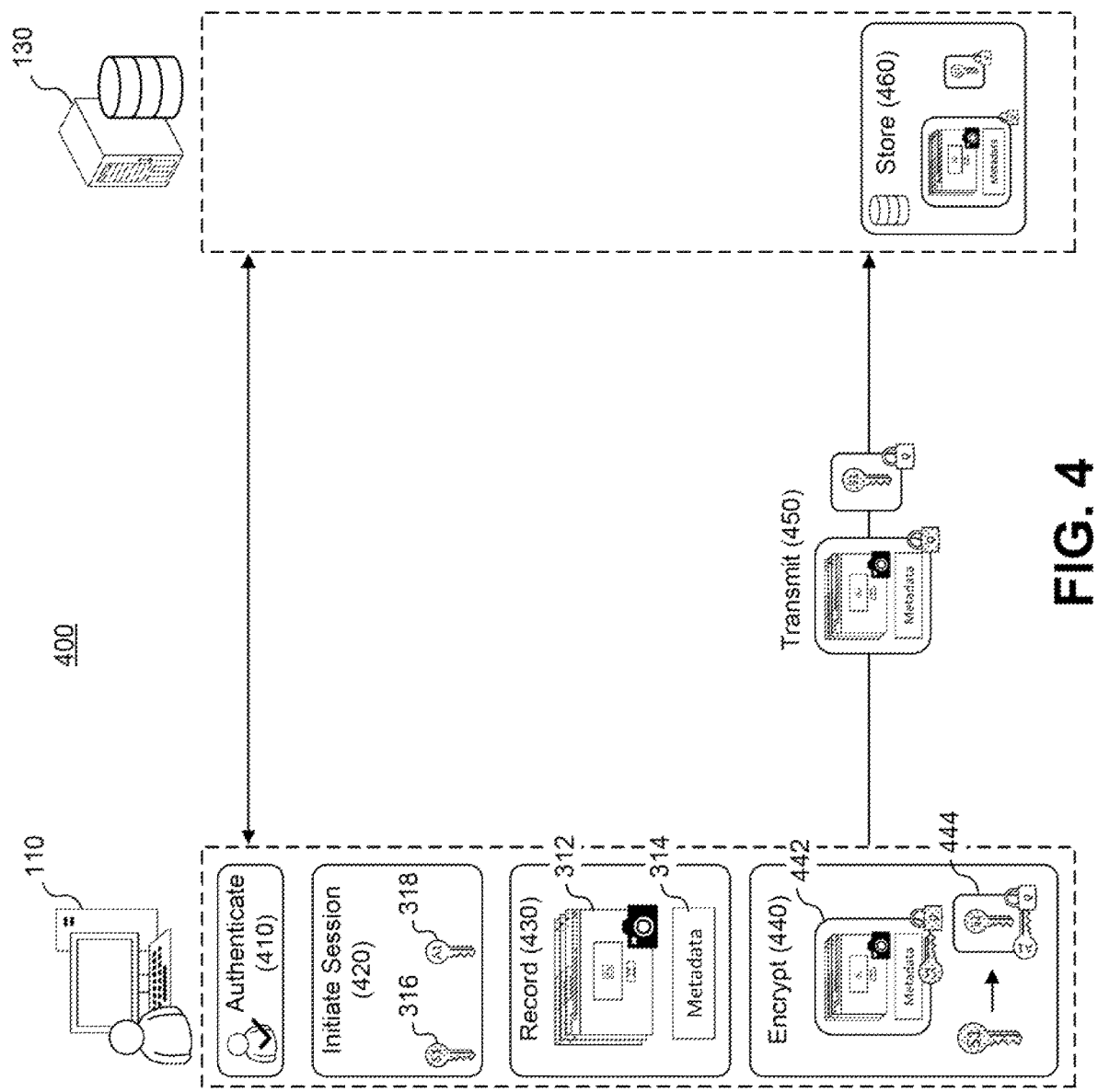
FIG. 4 is a block diagram illustrating an example process for recording browser session data at a user endpoint device, consistent with the disclosed embodiments.

FIG. 4 is a block diagram illustrating an example process 400 for recording browser session data at a user endpoint device, consistent with the disclosed embodiments. In particular, process 400 may represent a recording phase in which activity of user 112 associated with a protected navigation location is recorded. As used herein, a recording may not necessarily refer to a continuous recording of all activities of a user, but may refer to a collection of particular data associated with a sensitive session, additional details of which are provided below. Process 400 may further include various security steps to enable recorded browser session data to be securely transmitted to server 130 and stored on server 130 for future auditing purposes.

As an initial step, process 400 may include an authentication step 410, in which user endpoint device 110 (or another device associated with user 112) performs an authentication of user 112. This authentication may be performed using a variety of suitable authentication methods. For example, in some embodiments, authentication 410 may include a password-based authentication through which user 112 provides a username, password, and/or other credentials for verification of an identity of user 112. Various other authentication methods may be used, such as certificate-based authentication, biometric authentication, token-based authentication, or the like. In some embodiments, a multi-factor authentication may be performed, in which two or more independent ways to verify user 112 are used. For example, in some embodiments, the user may be directed for authentication to an IDP as a first authentication factor, and may be directed to a secured web page configured to act as a second authentication factor. In some embodiments, this second factor may include displaying an HTML element, such as HTML element 320, within browser 300 on user endpoint device 110. This HTML element may be used to further verify the identity of user 112. In some embodiments, server 130 may be involved in authentication 310. For example, server 130 may be configured to validate one or more credentials of user 112, or perform various other security functions.

In some embodiments, process 400 may include an initiation step 420 in which a browser session associated with user 112 is initiated and recorded. In some embodiments, the session may be initiated based on a navigation by user 112 to a protected navigation location. For example, user 112 may navigate to a protected navigation location 304 using browser 300. In some embodiments initiation step 420 may include generating session key 316 and accessing first auditor key 318, as described in further detail above with respect to FIG. 3.

Process 400 may further include a recording step 430. For example, this may include recording screenshots 312 and metadata 314, as described above. In some embodiments, recording step 430 may include detecting one or more trigger actions by browser extension 310. Based on the detected trigger actions, browser extension 310 may capture screenshots and associated metadata to be stored on server 130 for future auditing. In step 440, browser extension 310 may perform an encryption step, as described above with respect to FIG. 3. In particular, browser extension 310 may encrypt screenshots 312 and metadata 314 using session key 316 to produce encrypted browser session data 442. Browser extension 310 may further encrypt session key 316 using first auditor key 318 to produce encrypted session key 444. Browser extension 310 may then transmit the encrypted browser session data 442 and encrypted session key 444 to server 130 in step 450. Server 130 may then store encrypted browser session data 442 and encrypted session key 444, for example, in database 132.

Figure 5:
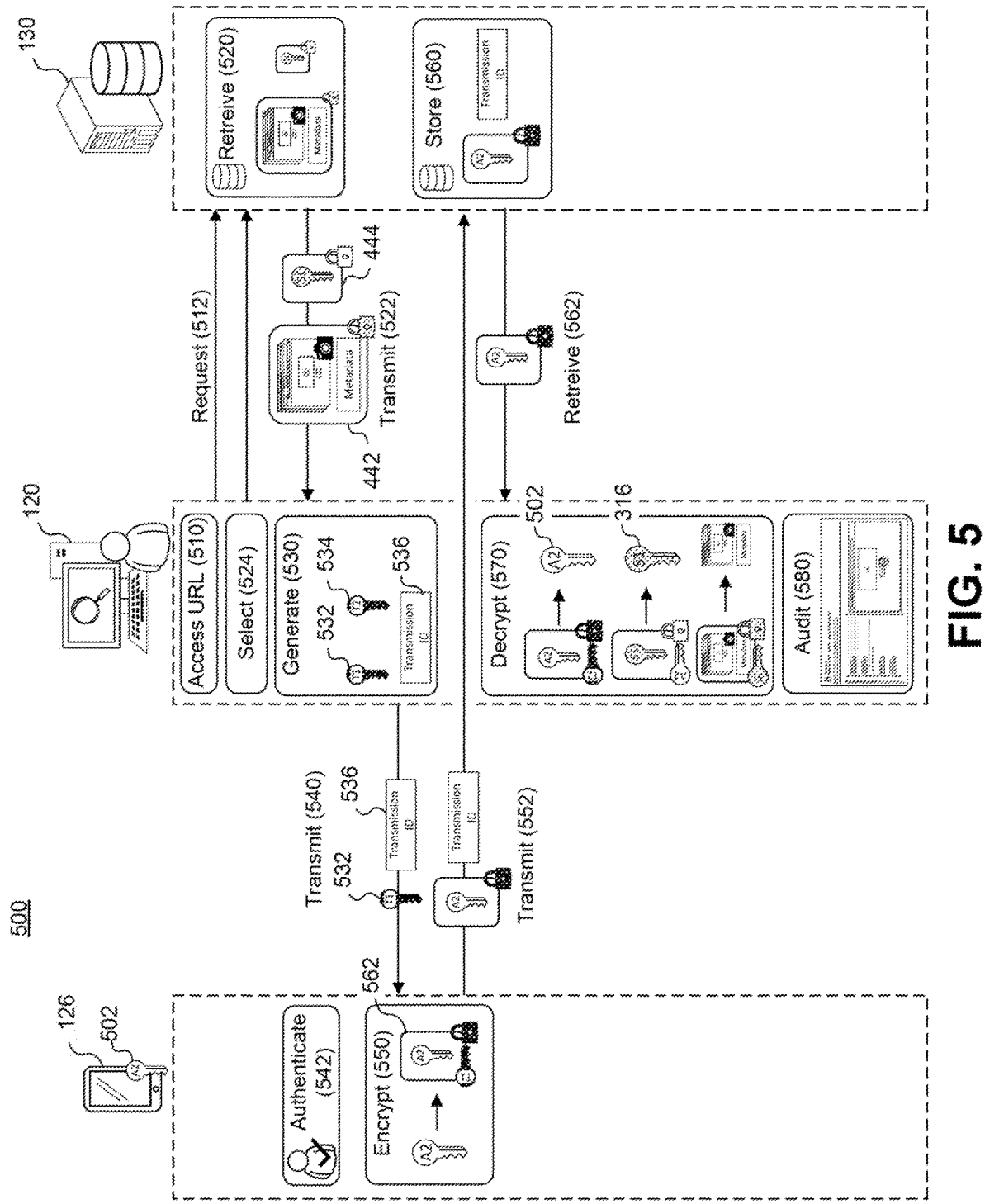
FIG. 5 is a block diagram illustrating an example process for auditing browser session data at a user endpoint device, consistent with the disclosed embodiments.

FIG. 5 is a block diagram illustrating an example process 500 for auditing browser session data at a user endpoint device, consistent with the disclosed embodiments. In particular, process 500 may represent an auditing phase in which browser session data recorded according to process 400 is reviewed by an auditor, such as auditor 122.

In step 510, auditor 122 may access a URL or other network location associated with auditing of recorded browser sessions. For example, in some embodiments, auditor 122 may navigate to a particular recording auditing location provided by server 130 (e.g., as a SaaS) for auditing recorded browser sessions. In some embodiments, step 510 may further include authenticating auditor 122. For example, auditor 122 may be required to provide one or more credentials to validate the identity of auditor 122. In step 512, auditor endpoint device 120 may submit an audit request 512 to server 130. In some embodiments, audit request 512 may be associated with a particular browser session. For example, auditor endpoint device 120 may request access to one or more of screenshots 312 and associated metadata 314. Accordingly, server 130 may access encrypted browser session data 442 and encrypted session key 444.

In step 520, server 130 may retrieve encrypted browser session data 442 and encrypted session key 444 from storage based on audit request 512. As described above with respect to step 460 (FIG. 4), encrypted browser session data 442 and encrypted session key 444 may be stored in a storage location, such as database 132. Accordingly, step 520 may include retrieving encrypted browser session data 442 and encrypted session key 444 from database 132 or any other storage location that may be used to store recorded browser session data.

In step 522, server 130 may then transmit encrypted browser session data 442 and encrypted session key 444 to auditor endpoint device 120 in response to the audit request. In some embodiments, server 130 may be configured to provide selected subsets of the encrypted browser session data to auditor endpoint device 120. For example, process 500 may include a step 524 in which server 130 receives a selection of a subset of the browser session data from auditor endpoint device 120. In some embodiments, this may be based on interaction by auditor 122 with an interface 700 (described below with respect to FIG. 7). The selected subset may be defined in various ways. For example, auditor 122 may select a particular trigger event, and based on the selection, screenshots and metadata associated with that event may be transmitted. As another example, auditor 122 may select a particular user, or a particular user session, and the encrypted browser session data associated with that selected user or user session may be transmitted to auditor endpoint device 120. The selected subset may be defined in various other ways, such as a selection of a range of times, a range of events, selection of one or more events, a search function (e.g., for a particular event type, a particular URL, a particular keyword, etc.), a filter function (e.g., filtering by time range, event type, etc.), or any other ways to narrow or filter browser session data. Accordingly, in step 522, server 130 may transmit a selected subset of encrypted browser session data 442 based on selection 524.

In some embodiments, auditor endpoint device 120 may have access to a second auditor key 502. For example, auditor endpoint device 120 may have received second auditor key 502 from key storage device 124 as described below in steps 530-562. In some embodiments, second auditor key 502 may be a private auditor key of a tenant associated with user 112 and auditor 122. Second auditor key 502 may be stored on key storage device 124 and used to decrypt the encrypted session key 444 in step 550 to produce session key 316. Notably, second auditor key 502 may be stored such that it is inaccessible to server 130.

In instances where auditor endpoint device 120 has access to second auditor key 502, auditor endpoint device 120 may then retrieve second auditor key 502 from storage (e.g., within metadata of a browser, as a cookie, on a local memory device, etc.). Accordingly, auditor endpoint device 120 may then proceed to in step 570 and decrypt encrypted session key 444 using second auditor key 502 to produce session key 316, and decrypt encrypted browser session data 442 using session key 316 to access screenshots 312 and metadata 314. Auditor endpoint device 120 may then allow a user 112 to audit the screenshots 312 and metadata 314 in step 580, for example through an interface 700 described in further detail below.

In some embodiments, auditor endpoint device 120 may not have access to second auditor key 502. For example, auditor endpoint device 120 may be configured to store auditor keys temporarily (e.g., in a transient memory), may not have received second auditor key 502 previously, may have an expired second auditor key 502, or the like. Accordingly, auditor endpoint device 120 may execute steps for receiving second auditor key 502 from key storage device 124. In some embodiments, this may include a step 530 in which auditor endpoint device 120 generates one or more transmission keys 532 and 534. Transmission keys 532 and 534 may be used to provide additional security for communications between auditor endpoint device 120, key storage device 124, and server 130 associated with second auditor key 502. It is to be understood, however, that in some embodiments, a similar process may be performed without transmission keys 532 and 534. In some embodiments, transmission keys 532 and 534 may be a private/public key pair. For example, a first transmission key 532 may be a public transmission key and a second transmission key 534 may be a private key. Alternatively or additionally, transmission keys 532 and 534 may be a symmetric key pair. In some embodiments, auditor endpoint device 120 may also generate a transmission identifier 536, which may be associated with transmission keys 532 and 534.

In step 540, auditor endpoint device 120 may transmit (or otherwise make available) first transmission key 532 and transmission ID 536 to key storage device 124. In some embodiments, this may include encoding first transmission key 532 and transmission ID 536 in a machine-readable code, such as a barcode, quick response (QR) code, or other form of visual code. In some embodiments, this may include displaying the machine-readable code on a browser window so that it may be scanned by key storage device.

Figure 6:
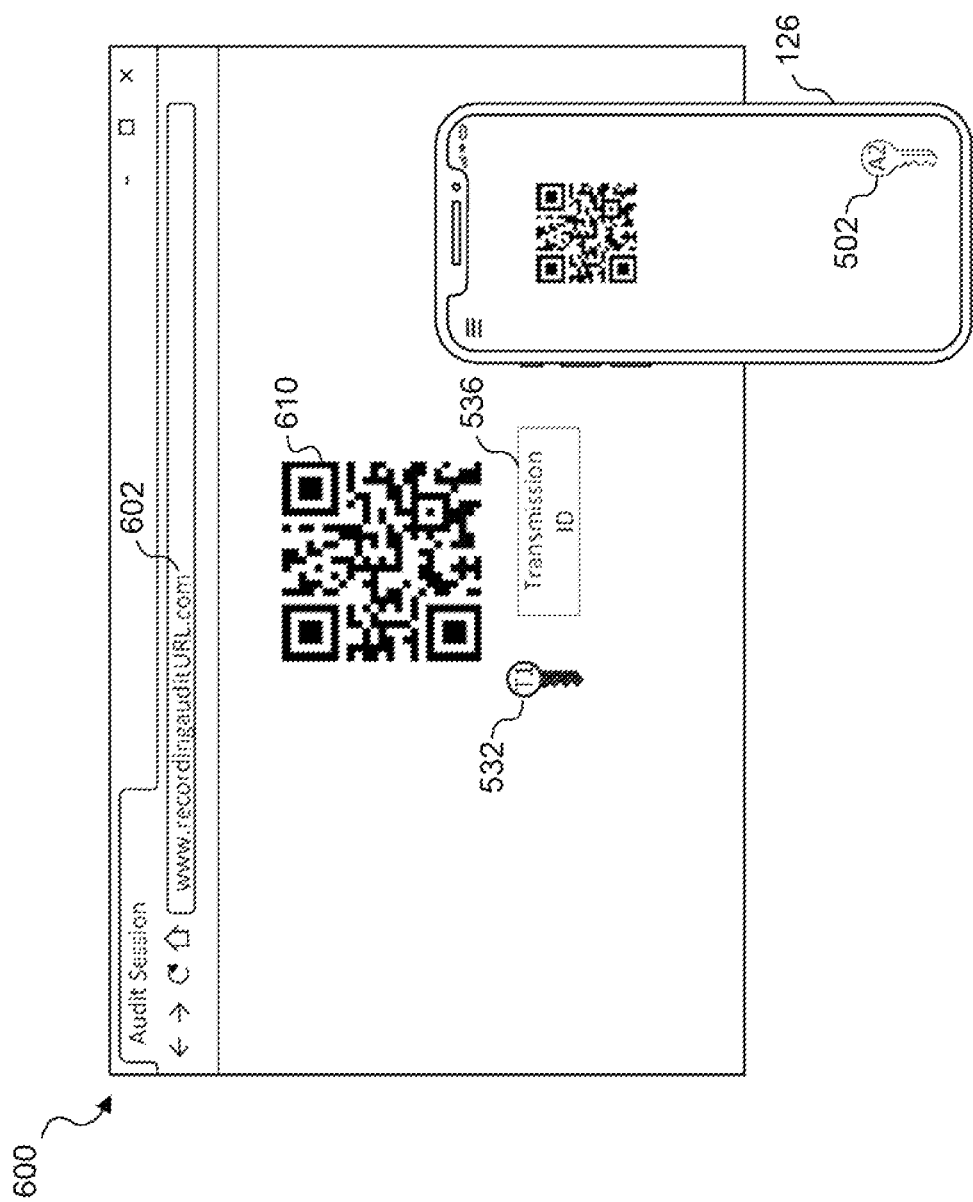
FIG. 6 illustrates an example interface for transferring data between an auditor endpoint device and a key storage device, consistent with the disclosed embodiments.

FIG. 6 illustrates an example interface for transferring data between auditor endpoint device 120 and key storage device 124, consistent with the disclosed embodiments. As shown, a browser application 600 may be used to display a machine-readable code 610. As with browser 300, browser 600 may be any application configured to access webpages or other network locations through a network, such as the Internet. For example, browser 600 may be a web browser application, such as Google Chrome™, Mozilla Firefox™, Microsoft Edge™, Internet Explorer™, Safari™, or similar applications. Auditor 122 may navigate to a recording auditing navigation location 602, which may provide access to recorded browser session data, as described above. In some embodiments, by navigating to recording auditing navigation location 602, auditor endpoint device 120 may initiate audit request 512.

As described above, auditor endpoint device 120 may generate a first transmission key 532 and transmission ID

536. Auditor endpoint device 120 may then encode first transmission key 532 and transmission ID 536 in the form of machine-readable code 610. In this example, machine-readable code 610 is represented as a QR code, however, it is to be understood that various other forms of machine-readable codes may be used. Auditor 122 may then scan machine-readable code 610 using key storage device 124, as shown in FIG. 6. Key storage device 124 may be configured to decode machine-readable code 610 to access first transmission key 532 and transmission ID 536. Key storage device 124 may store a second auditor key 502, which may be a private auditor key of an auditor key pair. First transmission key 532 may be used by key storage device 124 to encrypt second auditor key 502. While FIG. 6 illustrates the use of machine-readable code 610 to provide first transmission key 532 and transmission ID 536 to key storage device 124, it is to be understood that this is provided by way of example, and various other methods may be used to transmit first transmission key 532 and transmission ID 536 to key storage device 124. For example, this may include another form of short-range communication, such as Bluetooth™, infrared, near-field communication (NFC) or various other types of short-range communication methods or protocols.

Returning to FIG. 5, in step 550, key storage device 124 may then encrypt second auditor key 502 using first transmission key 532 (received in step 540) to produce encrypted second auditor key 562. This may ensure that second auditor key 502 is not transmitted unencrypted from mobile device 124 to server 130. In some embodiments, process 500 may further include a step 542 of authenticating auditor 122 at key storage device 124. For example, this may include a biometric authentication (e.g., based on a fingerprint, palm print, vein pattern, facial recognition, DNA, hand geometry, iris or retina identification, gait or other behavioral characteristics, or the like), or any other form of authentication. This authentication may enable access to second auditor key 502 through key storage device 124. In step 552, key storage device 124 may transmit encrypted second auditor key 562 along with transmission ID 536 to server 130. Server 130 may then store encrypted second auditor key 562 in step 560.

In step 562, auditor endpoint device 120 may retrieve encrypted second auditor key 562 from server 130. In some embodiments, encrypted second auditor key 562 may be stored in a known or specified location on server 130. In some embodiments, the location may be specified based on transmission ID 536. For example, auditor endpoint device 120 may reference transmission ID 536 (generated in step 530) to locate the encrypted second auditor key 562. As part of step 570, auditor endpoint device 120 may then decrypt encrypted second auditor key 562 using second transmission key 534 to produce second auditor key 502. Accordingly, as a result of steps 530-570, auditor endpoint device 120 may access second auditor key 502 in a secure manner.

In the example described above with respect to steps 530-570, key storage device may be an auditor mobile device configured to provide second auditor key 502 based on authentication of auditor 122. While steps 530-570 are provided by way of example, various other steps for retrieving second auditor key 502 may be used, which may depend on a type of key storage device that is used. Accordingly, steps 530-570 may not necessarily be applicable for other forms of key storage devices. For example, key storage device 124 may be a flash drive or other memory device configured to store second auditor key 502 and provide second auditor key 502 through a communication link, such as a USB interface, Bluetooth™, NFC, or any other forms of short-range communication. In some embodiments, this may include an authentication step for authenticating auditor 122. For example, key storage device 124 may further include a fingerprint scanner or other biometric device for authenticating auditor 122 and may transfer second auditor key 502 to auditor endpoint device 120 based on a successful authentication. Alternatively or additionally, the authentication may occur through auditor endpoint device 120. For example, auditor 122 may provide credentials, biometric information, other any other form of authentication information through auditor endpoint device 120. As another example, key storage device 124 may be integrated with auditor endpoint device 120 (e.g., as part of memory 260). Accordingly, second auditor key 502 may be stored within auditor endpoint device 120 in a secure location and key storage device 124 may take the form of a software-based authenticator configured to allow second auditor key 502 to be retrieved based on an authentication of auditor 122 at auditor endpoint device 120. In some embodiments, a WebAuthn standard or other form of web-based authentication standard may be used for securely storing second auditor key 502. While various examples are provided herein, it is to be understood that the present disclosure is not limited to any particular form of key storage device or methods for securely providing second auditor key 502 to auditor endpoint device 120.

Notably, regardless of the type of key storage device 124 that is used, server 130 may not have access to second auditor key 502 in an unencrypted form and therefore may not have access to session key 316 or the recorded browser session data. In some embodiments, auditor endpoint device 120 may then store second auditor key 502 for future access.

As described above, step 570 may include decrypting encrypted session key 444 using second auditor key 502 to produce session key 316. Further, step 570 may include decrypting encrypted browser session data 442 using session key 316 to provide access to screenshots 312 and metadata 314. Process 500 may then include a step 580 in which a user (e.g., auditor 122) may review screenshots 312 and metadata 314. In some embodiments, this may be performed through an interface 700, as described further below.

As a result of process 500, screenshots 312 and metadata 314 may be transmitted from server 130 to auditor endpoint device 120 in a secure manner. In particular, server 130 may not have access to screenshots 312 and metadata 314 in an unencrypted form. Server 130 further may not have access to second auditor key 502 in an unencrypted form, which may be required to access screenshots 312 and metadata 314. Moreover, in some embodiments, only particular data associated with a recorded browser session may be transmitted (e.g., based on selection 524), which may further improve security and reduce storage, transmission, and processing bandwidth requirements.

Figure 7:
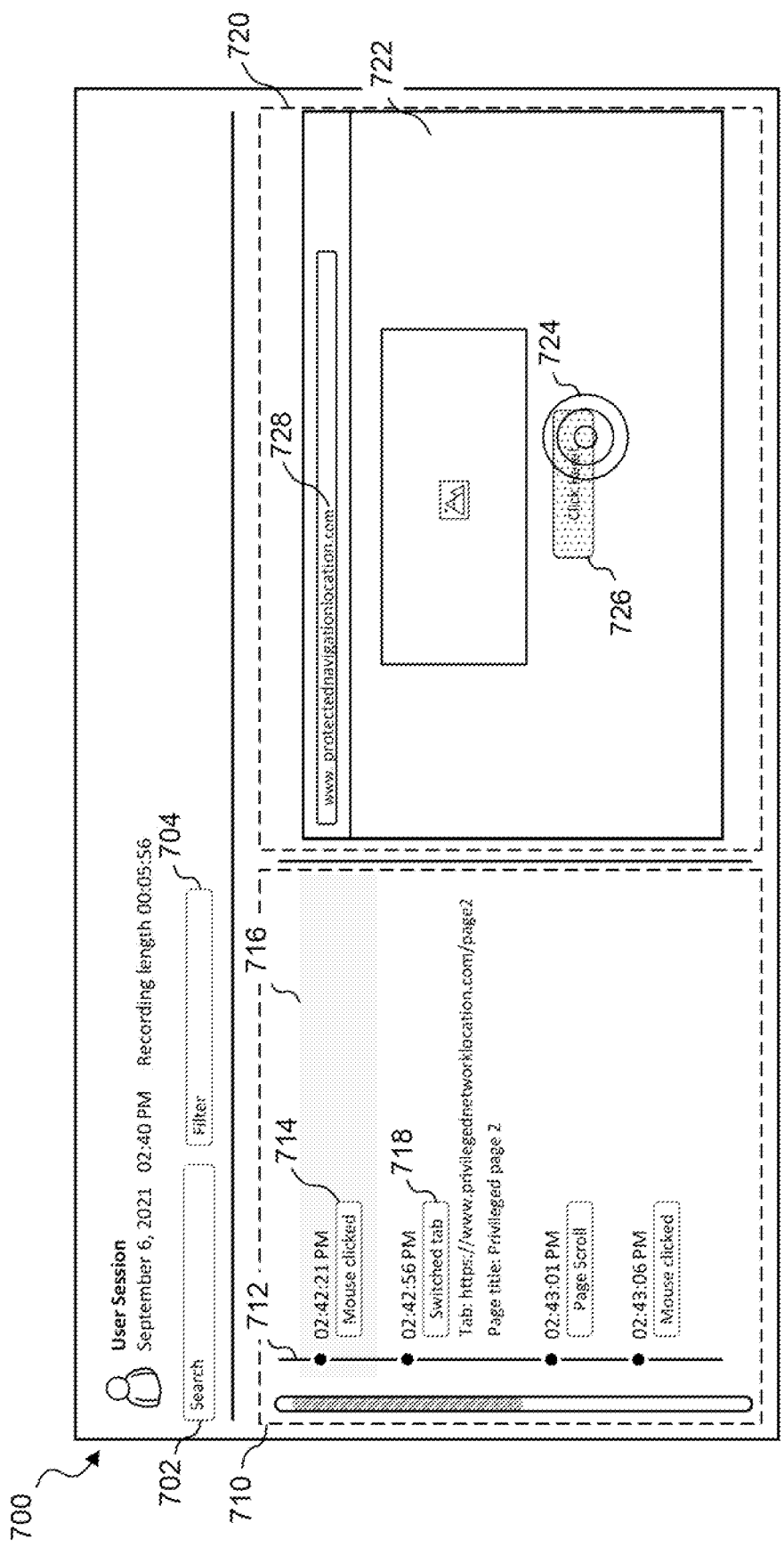
FIG. 7 illustrates an example interface for auditing recorded browser session data, consistent with the disclosed embodiments.

FIG. 7 illustrates an example interface 700 for auditing recorded browser session data, consistent with the disclosed embodiments. Interface 700 may be displayed on an auditor endpoint device for reviewing browser session data. For example, interface 700 may be displayed through auditor endpoint device 120 as part of step 580 described above to allow auditor 122 to review and navigate screenshots 312 and/or metadata 314. Interface 710 may include a navigation pane 710 and a display pane 720. Auditor 122 may interact with navigation pane to navigate and/or select various screenshots or metadata. Selected information may then be displayed in display pane 720.

In some embodiments, navigation pane 710 may include a timeline 712 through which various events may be presented chronologically. For example, as shown in FIG. 7, timeline 712 may include events 714 and 718. The events in timeline 712 may correspond to trigger events that caused screenshots and other metadata to be displayed. Accordingly, selection of one or more of the events in timeline 712 may cause the corresponding data associated with the event to be displayed in display pane 720. Timeline may further include other information associated with an event, such as a timestamp, an event type, a URL or network location, a page title, an indication of which tab is active, a number of times a user has visited a page, or any other information that may be associated with an event. Timeline 712 may be populated based on information stored in metadata 314.

As an illustrative example, auditor 122 may select event 714, which may correspond to user 112 clicking a mouse of user endpoint device 110. For example, this may include clicking element 324, as described above with respect to FIG. 3. In some embodiments, a visual indicator 716 may indicate which event has been selected and is being displayed in display pane 720. In this example, visual indicator 716 may be a highlight of event 714 in a different shade or color. Various other visual indicators may be used, such as display of a graphical icon, a change in font of event 714 (e.g., bold, italics, changes in color, etc.), an outline, or any other change to visibly distinguish a selected element.

Based on the selection of event 714, interface 700 may display screenshot 722, which may have been captured based on user 112 clicking on element 324. In some embodiments, display pane 720 may include other elements based on metadata associated with screenshot 722. For example, this may include overlaying a marker 724, which may indicate a location of cursor 322 when user 112 clicked on element 324. As another example, display pane 720 may include a marker 726 highlighting or otherwise indicating which element user 112 interacted with. Display pane 720 may include other information from metadata 314, including URL 728 (which may correspond to protected navigation location 304), a page title, a window height and width, text (e.g., processed through OCR, etc.), or various other forms of information, including any of the various forms of metadata described above.

Timeline 712 may further include an event 718 associated with user 112 switching tabs in browser 300. Selecting event 718 may update the screenshot and other information displayed in display pane 720. For example, selecting 718 may cause a screenshot of a tab that user 112 switched to (e.g., tab 306) to be displayed in display pane 720. In some embodiments, display pane 720 may display information for more than one event overlaid on the same screenshot. For example, if user 112 also clicked image 326 within URL 728, additional markers may be displayed on the same screenshot 722. In some embodiments, display pane 720 may be interactive. For example, auditor 122 may click on marker 726 (or marker 724), which may cause display pane 720 to be updated to display a screenshot of what user 112 was presented upon clicking element 324.

In some embodiments, interface 700 may include additional elements for searching or filtering browser session data associated with a user or tenant. For example, interface 700 may include a search bar 702 through which auditor 122 may search for particular keywords, or other metadata information included in metadata 314. Additionally or alternatively, interface 700 may include a filter element 704 through which auditor 122 may filter data to be displayed in navigation pane 710. For example, this may include filtering particular users, particular time or date ranges, particular URLs or domains, or various other filters that may be applied to metadata 714. In some embodiments, interface 700 may display other information, such as information about user 112, a date of a recording, a length or time of a recording, credentials or privileges of user 112, or any other information associated with one or more recorded browser sessions.

Figure 8:
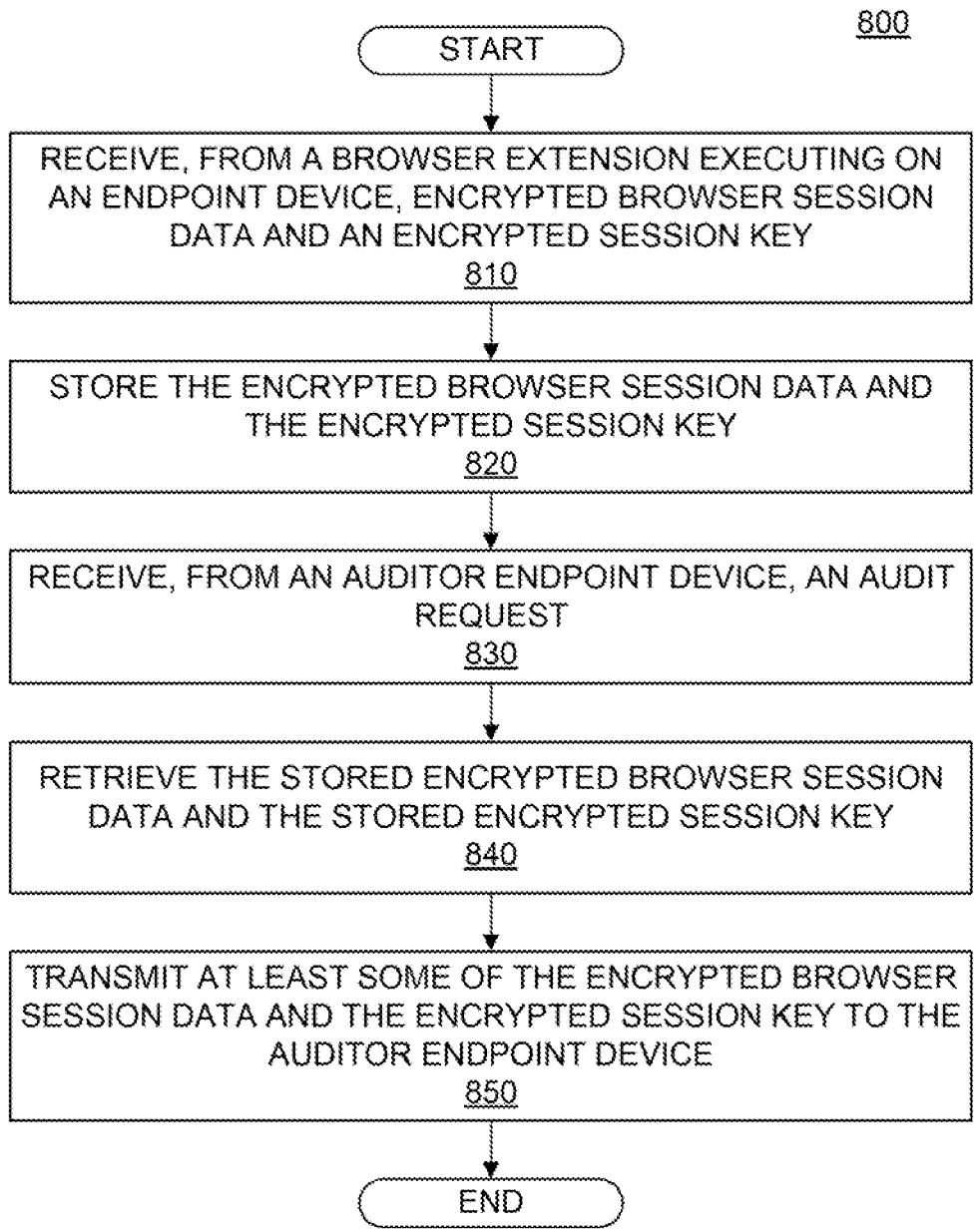
FIG. 8. is a flowchart showing an example process for securely and privately auditing web sessions, consistent with the disclosed embodiments.

FIG. 8 is a flowchart showing an example process 800 for securely and privately auditing web sessions, consistent with the disclosed embodiments. Process 800 may be performed by at least one processing device of a server, such as processor 210, as described above. In some embodiments, a non-transitory computer readable medium may contain instructions that when executed by a processor cause the processor to perform process 800. Further, process 800 is not necessarily limited to the steps shown in FIG. 8, and any steps or processes of the various embodiments described throughout the present disclosure may also be included in process 800, including those described above with respect to, for example, FIGS. 4 and 5.

In step 810, process 800 may include receiving, from a browser extension executing on a user endpoint device, encrypted browser session data and an encrypted session key. For example, this may include receiving encrypted browser session data from browser extension 310. The encrypted browser session data may comprise browser session data recorded by the browser extension and encrypted by the browser extension using a session key. For example, the browser session data may include screenshots 312 and metadata 314, which may be encrypted using session key 316. In some embodiments, the browser session data may be derived from actions taken by a user during a browser session. For example, user 112 may interact with a protected navigation location 304, which may include clicking on one or more elements, navigating a webpage, interacting with browser tabs, or the like. As described above, the browser may be configured to detect various recording triggers and capture screenshots and other metadata by the triggers. Accordingly, the browser session may detect a recording trigger associated with the endpoint device and record the browser session data based on the detected recording trigger. In some embodiments, this recording trigger may be invoked in response to an action taken by a user during the browser session.

The encrypted session key may comprise the session key having been encrypted by the browser extension using a first auditor key. In some embodiments, the browser extension may be configured to generate the session key. For example, the browser extension may be configured to detect that a user has navigated to a protected navigation location and may generate the session key based on the detected navigation to the protected navigation location.

In some embodiments, the first auditor key may be associated with a tenant. For example, as described above, a tenant may be an organization or other entity or group of entities associated with user 112. As described above, step 810 may further include making the first auditor key available to the browser extension. For example, this may include embedding the first auditor key in an HTML element displayed through the browser, providing the first auditor key through a cookie or token, or various other methods. The first auditor key may be made available to the browser extension based on an indication of the tenant. For example, user 112 may provide authentication credentials, which may indicate the tenant, and the first auditor key may be provided based on identification of the tenant.

In step 820, process 800 may include storing the encrypted browser session data and the encrypted session key. For example, this may include storing encrypted browser session data 424 and encrypted session key 444 in database 312, as described above with respect to step 460.

In step 830, process 800 may include receiving, from an auditor endpoint device, an audit request associated with the stored encrypted browser session data. For example, this may include receiving an audit request from auditor endpoint device 120, as described above with respect to step 512. In some embodiments, the audit request may be based on an auditor identity navigating to a recording auditing navigation location. For example, a recording auditing navigation location may be defined such that when auditor 122 navigates to the recording auditing navigation location, an audit session request is initiated. In some embodiments, the particular recording auditing navigation location may be unique to a tenant associated with auditor 122.

In step 840, process 800 may include retrieving the stored encrypted browser session data and the stored encrypted session key based on the audit request. For example, step 840 may correspond to step 520 described above. In some embodiments, step 840 may include retrieving a subset of encrypted browser session data 424. For example, process 800 may further include receiving, from the auditor endpoint device, an indication of a selected subset of the encrypted browser session data, as described above with respect to step 524. This subset may be defined in various ways. For example, the selected subset may be selected based on one or more of a particular trigger event, a particular user, a particular user session, a range of times, a range of events, a selection of one or more events, a search function, and a filter function.

In step 850, process 800 may include transmitting at least some of the encrypted browser session data and the encrypted session key to the auditor endpoint device. For example, step 850 may correspond to step 552, as described above. In some embodiments, transmitting at least some of the encrypted browser session data to the auditor endpoint device may comprise transmitting a selected subset of the encrypted browser session data, as described above. Step 850 may enable access to the browser session data by the auditor endpoint device. For example, the auditor endpoint device may be configured to access a second auditor key associated with the tenant from a key storage device. In some embodiments, the key storage device may be a mobile device, as described above. The auditor endpoint device may further be configured to decrypt the encrypted session key using the second auditor key and decrypt the encrypted browser session data using the decrypted session key to enable access to the browser session data.

In some embodiments, accessing the second auditor key may include accessing the second auditor key from a storage location associated with the browser or browser extension. Alternatively or additionally, accessing the second auditor key may include prompting the key storage device to provide the second auditor key, which may include additional encryption of the second auditor key. For example, this may include generating a transmission key pair comprising a first transmission key and a second transmission key; transmitting the first transmission key to a key storage device, wherein the key storage device is configured to: retrieve an encrypted second auditor key from a storage location, the encrypted second auditor key having been encrypted by the key storage device using the first transmission key and transmit the encrypted second auditor key to a specified network location; retrieving the encrypted second auditor key from the specified network location; and decrypting the encrypted second auditor key using the second transmission key. In some embodiments, accessing the second auditor key from the key storage device may further comprise generating a transmission identifier; transmitting the transmission identifier to the auditor endpoint device; and selecting the second transmission key based on the transmission identifier. In some embodiments, the auditor endpoint device may be configured to present the first transmission key to the key storage device via a short-range communication. For example, the short-range communication may include at least one of displaying a machine-readable code encrypting the transmission key or transmitting the transmission key via a short-range communication protocol. In some embodiments, the key storage device is configured to encrypt the second auditor key based on an authentication of an auditor identity using the key storage device It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely and privately auditing web sessions, the operations comprising:
receiving, at a server from a user endpoint device, encrypted browser session data and an encrypted session key, wherein:

the encrypted browser session data comprises browser session data recorded by a browser extension and encrypted by the browser extension using a session key, the browser extension executing on the user endpoint device; and the encrypted session key comprises the session key having been encrypted by the browser extension using a first auditor key associated with a tenant;

storing the encrypted browser session data and the encrypted session key at the server;

receiving, at the server from an auditor endpoint device, an audit request associated with the stored encrypted browser session data;

retrieving, by the server, the stored encrypted browser session data and the stored encrypted session key based on the audit request;

transmitting at least some of the encrypted browser session data and the encrypted session key from the server to the auditor endpoint device to enable access to the browser session data by the auditor endpoint device, wherein the auditor endpoint device is configured to:

access a second auditor key associated with the tenant from a key storage device;

decrypt the encrypted session key using the second auditor key; and decrypt the encrypted browser session data using the decrypted session key to enable access to the browser session data.

2. The non-transitory computer readable medium of claim 1, wherein the second auditor key is stored on the key storage device and is inaccessible to the at least one processor.

3. The non-transitory computer readable medium of claim 1, wherein the operations further comprise making the first auditor key available to the browser extension based on an indication of the tenant.

4. The non-transitory computer readable medium of claim 3, wherein the indication of the tenant is based on authentication of the user.

5. The non-transitory computer readable medium of claim 1, wherein the browser extension is configured to:

detect that a user has navigated to a protected navigation location; and generate the session key based on the detected navigation to the protected navigation location.

6. The non-transitory computer readable medium of claim 1, wherein storing the encrypted browser session data and the encrypted session key comprises storing the encrypted browser session data and the encrypted session key in a database.

7. The non-transitory computer readable medium of claim 1, wherein the browser session data is derived from actions taken by a user during a browser session.

8. The non-transitory computer readable medium of claim 1, wherein the browser extension is configured to:

detect a recording trigger associated with the endpoint device; and record the browser session data based on the detected recording trigger.

9. The non-transitory computer readable medium of claim 8, wherein the recording trigger is invoked in response to an action taken by a user during the browser session.

10. A computer-implemented method for securely and privately auditing secured web sessions, the method comprising:

receiving, at a server from a user endpoint device, encrypted browser session data and an encrypted session key, wherein:

the encrypted browser session data comprises browser session data recorded by a browser extension and encrypted by the browser extension using a session key, the browser extension executing on the user endpoint device; and the encrypted session key comprises the session key having been encrypted by the browser extension using a first auditor key associated with a tenant;

storing the encrypted browser session data and the encrypted session key at the server;

receiving, at the server from an auditor endpoint device, an audit request associated with the stored encrypted browser session data;

retrieving, by the server, the stored encrypted browser session data and the stored encrypted session key based on the audit request;

transmitting at least some of the encrypted browser session data and the encrypted session key from the server to the auditor endpoint device to enable access to the browser session data by the auditor endpoint device, wherein the auditor endpoint device is configured to:

access a second auditor key associated with the tenant from a key storage device;

decrypt the encrypted session key using the second auditor key; and decrypt the encrypted browser session data using the decrypted session key to enable access to the browser session data.

11. The computer-implemented method of claim 10, further comprising receiving, from the auditor endpoint device, an indication of a selected subset of the encrypted browser session data.

12. The computer-implemented method of claim 11, wherein transmitting at least some of the encrypted browser session data to the auditor endpoint device comprises transmitting the selected subset of the encrypted browser session data.

13. The computer-implemented method of claim 11, wherein the selected subset is selected based on at least one of: a particular trigger event, a particular user, a particular user session, a range of times, a range of events, a selection of one or more events, a search function, and a filter function.

14. The computer-implemented method of claim 10, wherein the key storage device is a mobile device.

15. The computer-implemented method of claim 10, wherein the audit request is based on an auditor identity navigating to a recording auditing navigation location.

16. The computer-implemented method of claim 10, wherein accessing the second auditor key from the key storage device by the auditor endpoint device comprises:

generating a transmission key pair comprising a first transmission key and a second transmission key;

transmitting the first transmission key to the key storage device, wherein the key storage device is configured to: retrieve an encrypted second auditor key, the encrypted second auditor key having been encrypted by the key storage device using the first transmission key; and transmit the encrypted second auditor key to a specified network location retrieving the encrypted second auditor key from the specified network location; and decrypting the encrypted second auditor key using the second transmission key.

17. The computer-implemented method of claim 16, wherein accessing the second auditor key from the key storage device further comprises:
generating a transmission identifier;
transmitting the transmission identifier to the auditor endpoint device; and
selecting the second transmission key based on the transmission identifier.

18. The computer-implemented method of claim 16, wherein the auditor endpoint device is configured to present the first transmission key to the key storage device via a short-range communication.

19. The computer-implemented method of claim 18, wherein the short-range communication includes at least one of displaying a machine-readable code encrypting the transmission key or transmitting the transmission key via a short-range communication protocol.

20. The computer-implemented method of claim 16, wherein the key storage device is configured to encrypt the second auditor key based on an authentication of an auditor identity using the key storage device.

\* \* \* \* \*